United States Patent [19]

Wetterhorn

[11] 4,246,796

[45] Jan. 27, 1981

[54] PRESSURE GAUGE CONSTRUCTION

[75] Inventor: Richard H. Wetterhorn, Fairfield, Conn.

[73] Assignee: Dresser Industries, Inc., Dallas, Tex.

[21] Appl. No.: 23,551

[22] Filed: Mar. 26, 1979

Related U.S. Application Data

[63] Continuation-in-part of Ser. No. 859,514, Dec. 12, 1977, which is a continuation of Ser. No. 708,470, Jul. 26, 1976, abandoned, which is a continuation of Ser. No. 413,483, Nov. 7, 1973, abandoned, which is a continuation-in-part of Ser. No. 186,120, Oct. 4, 1971, abandoned.

[51] Int. Cl.³ .............................................. G01L 7/04
[52] U.S. Cl. ...................................... 73/732; 73/739
[58] Field of Search ................ 73/736, 741, 742, 743, 73/739, 707, 732–735, 737, 738

[56] References Cited

U.S. PATENT DOCUMENTS

| 1,621,320 | 3/1927 | Griffin | 73/739 |
|---|---|---|---|
| 1,941,613 | 1/1934 | McDonell | 73/707 |
| 2,796,765 | 6/1957 | Huston | 73/739 |
| 2,897,675 | 8/1959 | Kocher et al. | 73/707 |
| 3,095,745 | 7/1963 | Kirwan | 73/736 |
| 3,214,979 | 11/1965 | Bissell et al. | 73/741 |
| 3,257,852 | 6/1966 | Perkins | 73/741 |
| 3,707,868 | 1/1973 | Fruit | 73/741 |

OTHER PUBLICATIONS

Negretti & Zambra sheet (publication), p. 15, (undated).

*Primary Examiner*—Donald O. Woodiel
*Attorney, Agent, or Firm*—Daniel Rubin

[57] ABSTRACT

A pressure gauge in which the amplifier communicating displacement motion of the pressure responsive element to the pointer indicator, is mounted in a spring suspension isolating it from the force transmitting rigid components of the gauge. The spring suspension is effected by a pair of spring members connected to the amplifier including one spring member supporting the amplifier in its isolated relation and another spring member enabling operation of the amplifier to be effected.

8 Claims, 7 Drawing Figures

PRESSURE GAUGE CONSTRUCTION

This application is a continuation-in-part of Ser. No. 859,514 Filed Dec. 12, 1977, which was a continuation of Ser. No. 708,470 filed July 26, 1976, now abandoned, which was a continuation of Ser. No. 413,483 filed Nov. 7, 1973, now abandoned, which was a continuation-in-part of Ser. No. 186,120 filed Oct. 4, 1971, now abandoned.

TECHNICAL FIELD

The field of art to which the invention pertains includes the art of measuring and testing as applicable to amplifier construction for gauge instruments.

BACKGROUND OF THE PRIOR ART

Pressure gauges are utilized in an endless number of commercial, industrial and domestic applications, many of which are subject to in-service conditions of high level pulsation or vibration produced either from the pressure source or the gauge mounting structure. Exemplifying these conditions are the pulsation and vibration which emanate from equipment such as reciprocating compressors, pumps, engines, etc. on which the gauge is supported.

Since most gauge constructions and their amplifiers in particular are typically unable to maintain structural integrity and/or provide adequate stability for readout when subjected to continuous in-service forces of pulsation or vibration, it has been common where such forces are anticipated to employ a dampening construction of sorts in association therewith. Where the problem force originates from pressure pulsation that can either be chronic or acute, a typical approach has been to utilize an auxiliary spring member or other suitable dampening device functioning as a filter link positioned in series between the output of the pressure responsive element and the input to the amplifier. Exemplifying constructions of that type are the disclosures contained in U.S. Pat. Nos. 1,494,496; 2,796,765; 3,257,852 and 3,214,979. A stabilizer construction for that purpose is disclosed in U.S. Pat. No. 1,941,613. For limiting vibration induced by dynamic loading being transmitted to the gauge support, an external spring structure has been utilized as exemplified by U.S. Pat. No. 2,897,675. Normally included with the latter has been the use of a flexible connection for supplying the pressure input to the gauge inlet.

While filter links of the aforementioned constructions would undoubtedly vary in the degree of success sought to be achieved, that approach has generally been recognized as ineffective in limiting dynamic forces additionally or solely imparted to the amplifier from vibrations originating in the gauge mount. On the other hand, the use of external springs or the like for limiting the latter have usually resulted in exorbitant spring sizes and special supports because of the relatively large gauge mass to be accommodated thereby. Needless to say, large spring sizes as a solution to that problem are not usually cost effective but rather to the contrary have tended to effect a disproportionate increase in the cost of equipment and/or installation. At the same time, the spring rates associated with the large spring sizes have tended toward producing gauge pointer instability thereby rendering readout of the gauge increasingly difficult. Despite recognition of the foregoing, a ready solution therefor has not heretofore been known.

SUMMARY OF THE INVENTION

This invention relates to pressure gauges and more specifically to an improvement therefor in which the amplifier driving the output pointer is mounted in a spring suspension isolating it from the force transmitting relatively rigid components of the gauge. The suspension is effected by a pair of spring members connected to the amplifier including one spring member supporting the amplifier isolated from the rigid components of the gauge assembly and another spring member enabling operation of the amplifier to be effected. By virtue of the spring member being situated between a rigid gauge component and the amplifier instead of between the mount and gauge socket as has previously been done, the required size, weight, spring rate and resulting fabrication costs of the intervening spring member are relatively miniscule as compared to the similar purpose constructions of the prior art.

Moreover, when utilizing an amplifier construction as disclosed in the parent application hereof, the amplifier can per se be mounted directly on the spring end of a Bourdon tube while a spring-like actuator extending from the gauge socket into the motion path of the amplifier defines a pivot axis therefor. With that arrangement, both the Bourdon tube and actuator can per se provide the amplifier suspension hereof as to inherently achieve spring isolation without any perceptible cost being attributed to the isolation feature. Where increased spring action for either or both of the spring elements is desirable in light of the anticipated level of forces to be encountered, that too can be readily added at minimal cost compared to similar purpose constructions of the prior art.

It is therefore an object of the invention to provide a novel pressure gauge construction for limiting the effects of pressure pulsations and/or mounting vibrations on the gauge amplifier.

It is a further object of the invention to effect the previous object in an uncostly manner as compared to similar purpose constructions of the prior art.

Figure 1:
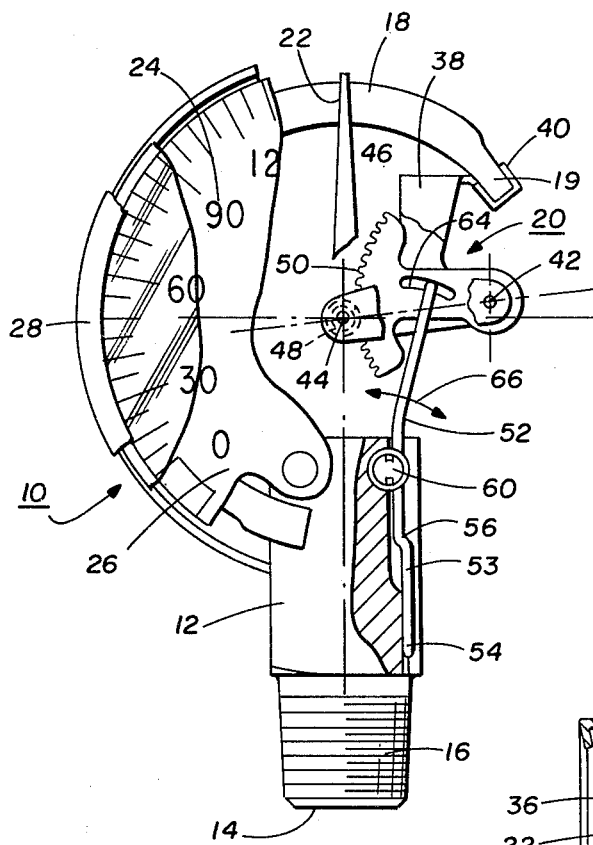
FIGS. 1 and 2 are fragmentary front and end elevations, respectively, of a pressure gauge embodying a floating amplifier utilizing the spring suspension hereof.
Figure 2:
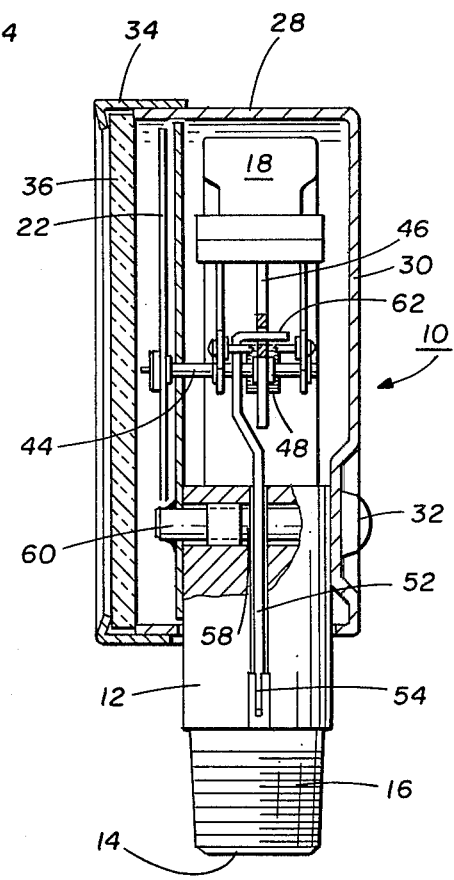

For an understanding of the invention, reference is first made to FIGS. 1 and 2 of the drawings in which there is illustrated a gauge construction of a type previously disclosed in the parent applications hereof. The pressure gauge, designated 10, includes a stem or socket 12 in which fluid pressure to be sensed is received at an inlet 14 and includes threads 16 for connecting the gauge to a system with which it is to be employed. Fluid pressure received at inlet 14 is communicated to a Bourdon tube 18 having a free end 19 that is subject to arcuate motion displacement in a well known manner in response to incremental pressure changes received at inlet 14. The motion of tube end 19 is conducted to amplifier 20 to produce correlated but amplified motion for operating a pointer 22 relative to pressue values 24 on dial face 26. Except for stem 12, each of the foregoing components comprise the operating mechanism of the gauge that is substantially contained within enclosed housing 28. The housing consists of a cupshaped, shell-like backing 30 secured via screws 32 to stem 12. A bezel 34 telescopically fit onto backing 30 secures transparent crystal 36 thereat for viewing the pointer position relative to dial face 26.

Amplifier 20, as more completely described in the parent applications hereof, is comprised of a central upright U-shaped carriage or frame 38 secured via a U-shaped bracket 40 mounted on displacement end 19 of Bourdon tube 18 as by welding, soldering, brazing or the like. Being secured in this arrangement, the carriage and components that it supports are subject to a floating movement conjointly with displacement deflection of tube end 19 as a result of pressure changes received at inlet 14.

Mounted in frame 38 are a pair of longitudinally displaced rotatable shafts 42 and 44, the former of which provides hinge support for a geared sector arm 46 while the latter constitutes the output drive shaft for operating pointer 22. Rotation of shaft 44 is effected by a pinion 48 secured thereto and meshing with sector gearing 50 of arm 46.

To enable operation of the amplifier there is provided an actuator in the form of an elongated metal wire or link 52 which at one end extends into a stem recess 53 to near thread 16 where the wire is securely staked at 54. Just above an offset 56 in wire actuator 52 the actuator engages against a conical nose 58 of an adjustable set screw 60 threadedly received in stem 12. Vertically above that location the actuator extends to an offset or crank bend 62 positioned within an elongated slot 64 of sector arm 46 for defining the pivot axis therefor. Being that actuator 52 is bent in spring-like engagement against conical nose 58, span adjustment in the direction of arrow 66 can be readily effected.

Since free end 19 of Bourdon tube 18 is characteristically unsupported cantilevered out from its base and is free to displace in response to pressure changes received at inlet 14, it enjoys by deduction, spring-like properties which are constantly engaged with amplifier 20 supported thereon. Cooperating with the Bourdon tube to spring isolate the amplifier is actuator 52 which being constructed of an elongated wire member of spring-like properties capable of being displaced by span adjustment screw 60, includes a cantilevered offset 62 transmitting these spring properties into slot 64 of sector arm 46. In this manner, therefore, the entire amplifier 20 is supported in a spring suspension by virtue of the Bourdon tube end constituting one spring connection with the applifier and actuator link 52 constituting the other spring connection with the amplifier, the latter being effective in limiting forces of vibration as might otherwise be transmitted from the mounting connection through socket 12 to the amplifier. Moreover, since Bourdon tube 18 and actuator link 52 by which the spring suspension is attained are per se inherently part of a standard gauge construction, the added feature and virtues of the spring suspension are achieved without additional cost being attributable to that feature.

The extent to which the spring properties of the Bourdon tube can be effectively useful in contributing to the amplifier isolation hereof will, of course, vary on a case-by-case basis depending both on the physical characteristics of the Bourdon tube being utilized and the magnitude of force to be isolated thereby. Typically, the spring rate of a Bourdon tube utilized on a 15 psig. gauge is usually just sufficient to drive the movement. By contrast, the spring rate of a Bourdon tube utilized in 2000 psig. gauge could require a supplemental spring assist to avoid destroying the amplifier in response to a sudden shock pressure force transmitted to the tube. Likewise, the ability of actuator 52 to function in a spring capacity is similarly dependent on its physical properties. Typically, actuator 52 is comprised of 0.032 inch stainless steel wire used in pressure gauges up to 4000 psig. rating which in the arrangement described can readily absorb vibrations at frequencies on the order of 120 impacts per second at amplitudes on the order of 0.020 inches.

Figure 3:
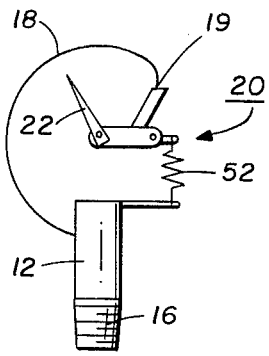
FIGS. 3 and 4 are schematic representations or modifications for the gauge construction of FIG. 1.
Figure 4:
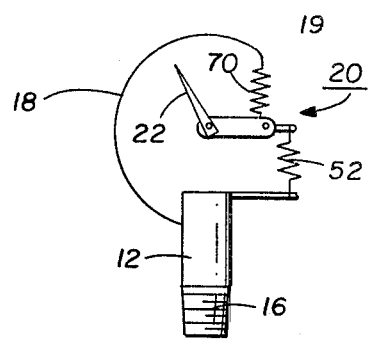

FIG. 3 comprises a schematic representation of FIGS. 1 and 2 while FIG. 4 incorporates an added spring 70 intervening between Bourdon tube 18 and amplifier 20 of FIG. 3. As stated previously, the need for a spring 70 is determined on the basis of the mentioned variables.

Figure 5:
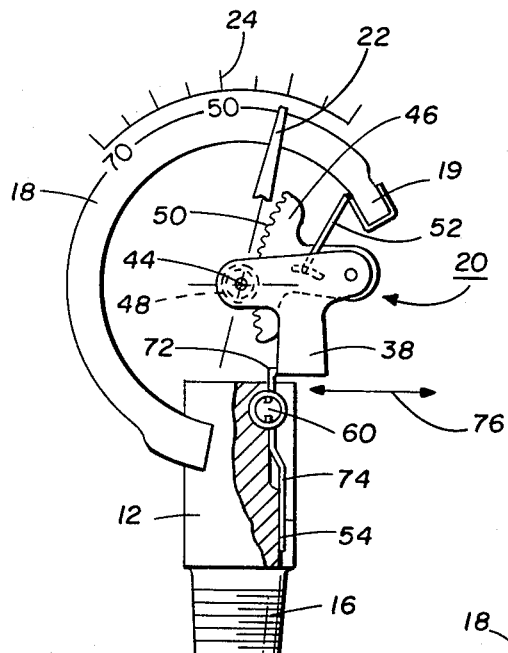
FIG. 5 is a fragmentary front elevation of a pressure gauge embodying a stationary amplifier utilizing the spring suspension hereof.

Referring now to FIG. 5, the embodiment thereof likewise disclosed in the parent applications includes a stationary amplifier 20 and an actuator 52 inverted and interchanged with respect to base 12 and tip 19 of Bourdon tube 18. In this arrangement, amplifier frame 38 is secured to the offset termination 72 of elongated spring-like link 74 staked at 54 and laterally displaceable by adjustable set screw 60 as described above. When calibrating for span, amplifier 20 rather than actuator link 52 is displaced in the direction of arrow 76. Since link 74 is characterized by spring-like properties, it is evident that its support offset 72 provides a spring support for amplifier 20. At the same time, Bourdon tube 18 along with actuator 52 provides a spring-like input to the amplifier such that they cooperate with spring 72 to provide spring suspension of the amplifier.

Figure 6:
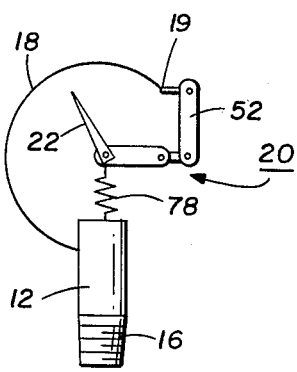
FIGS. 6 and 7 are schematic modifications for the gauge construction of FIG. 5.
Figure 7:
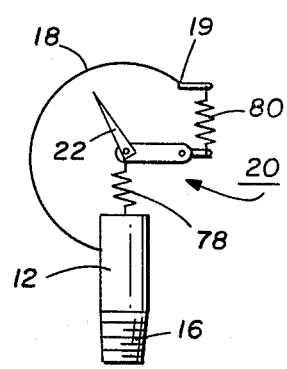

The modification of FIG. 6 includes introduction of an added spring member 78 intervening between either the offset end of actuator 74 and frame 38 or optionally directly between base 12 and frame 38 were actuator link 74 to be omitted. Similarly, FIG. 7 includes both a spring 78 and a spring 80, the latter being situated intervening between amplifier 20 and end 19 of Bourdon tube 18 where the magnitude of forces warrant an auxiliary spring for reasons previously stated.

By the above description there is disclosed a novel construction for a pressure gauge in which the amplifier thereof driving the output point is vibration isolated from the relatively rigid components of the gauge without the complexity and attendant costs associated with similar purpose constructions of the prior art. In accordance herewith, the spring suspension is achieved utilizing a pair of inexpensive spring connections to the amplifier in which one spring serves to support the amplifier in its isolated relation while the other spring connection enables operation of the amplifier to be effected. The precise size, type, capacity, etc. of the related spring elements to be utilized will, of course, vary with the level of forces to be encountered. In any event, however, by placing these spring elements at the locations indicated, the advantages of the spring suspension can be achieved at a significant reduction in cost as compared to the prior art approaches thereto. While for the sake of disclosure the invention hereof has been described utilizing a Bourdon tube as the condition responsive element, the invention is not intended to be so limited but rather is intended for use with other forms of condition responsive elements as disclosed for example in the parent applications hereof.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a pressure gauge including a pressure responsive element having a free end subject to displacement motion in response to changes in pressure supplied thereto, an amplifier comprising a segment gear, a pinion driven by said segment gear and a frame supporting both said segment gear and said pinion, said amplifier being operable for communicating displacement motion of said pressure responsive element to an output drive, a housing enclosing said pressure responsive element and said amplifier, and a connector extending through said housing and adapted for installing the gauge in a system for which pressure measurement is to be obtained, the improvement comprising means affording isolation of said amplifier in a spring suspension intervening between said amplifier and relatively rigid components of the gauge.

2. In a pressure gauge according to claim 1 in which said improvement comprises a first spring member extending between said amplifier and its support and a second spring member extending into an engaging relation with said amplifier for enabling operation thereof.

3. In a pressure gauge according to claims 1 or 2 in which said pressure responsive element comprises a Bourdon tube.

4. In a pressure gauge according to claim 3 in which said amplifier is supported on the free end of said Bourdon tube comprising said first spring member and there is included a spring-like elongated actuator extending from a secured location on said gauge into the displacement path of said amplifier comprising said second spring member.

5. In a pressure gauge according to claim 3 in which said amplifier is connectably supported on the free end of said Bourdon tube by said first spring member intervening therebetween and there is included a spring-like elongated actuator extending from a secured location on said gauge into the displacement path of said amplifier comprising said second spring member.

6. In a pressure gauge according to claim 3 in which said first spring member is positioned intervening between a relatively rigid component of the gauge and said amplifier.

7. In a pressure gauge according to claim 6 in which said Bourdon tube comprises said second spring member.

8. In a pressure gauge according to claim 6 in which second spring member is supported intervening between said Bourdon tube and the input connection to said amplifier.

* * * * *